United States Patent [19]

Brinegar

[11] 4,084,625
[45] Apr. 18, 1978

[54] WIRE BANDING TOOL AND CABLE SPLICE

[76] Inventor: Claude E. Brinegar, 18400 SW. Pacific Hwy., Sherwood, Oreg. 97140

[21] Appl. No.: 711,394

[22] Filed: Aug. 3, 1976

[51] Int. Cl.² ............................................. B21F 9/02
[52] U.S. Cl. .................................. 140/123.5; 81/9.3
[58] Field of Search ............... 81/9.3; 140/93.2, 123.5, 140/117; 254/67

[56] References Cited

U.S. PATENT DOCUMENTS

| 784,114 | 3/1905 | Moock | 81/9.3 |
| 1,078,533 | 11/1913 | Beaudette | 81/9.3 |
| 3,377,422 | 4/1968 | Trimble et al. | 174/93 |

Primary Examiner—Lowell A. Larson
Attorney, Agent, or Firm—Klarquist, Sparkman, Campbell, Leigh, Hall & Whinston

[57] ABSTRACT

A tool for forming a wire clamp includes a tube having its forward end somewhat flattened and grooved, and a pulling screw is slidable in the tube with a roll pin projecting through the slots and pullable by a wing nut screwed thereon. A waterproof cable splice includes flanged elastomer grommets projecting into a plastic sleeve and pressed on insulating jackets of two cables having conductors connected by a crimped conductive sleeve. Hose type clamps compress the end portions of the plastic sleeve to seal them to the grommets and to compress the grommets onto the jackets to seal them thereto.

7 Claims, 9 Drawing Figures

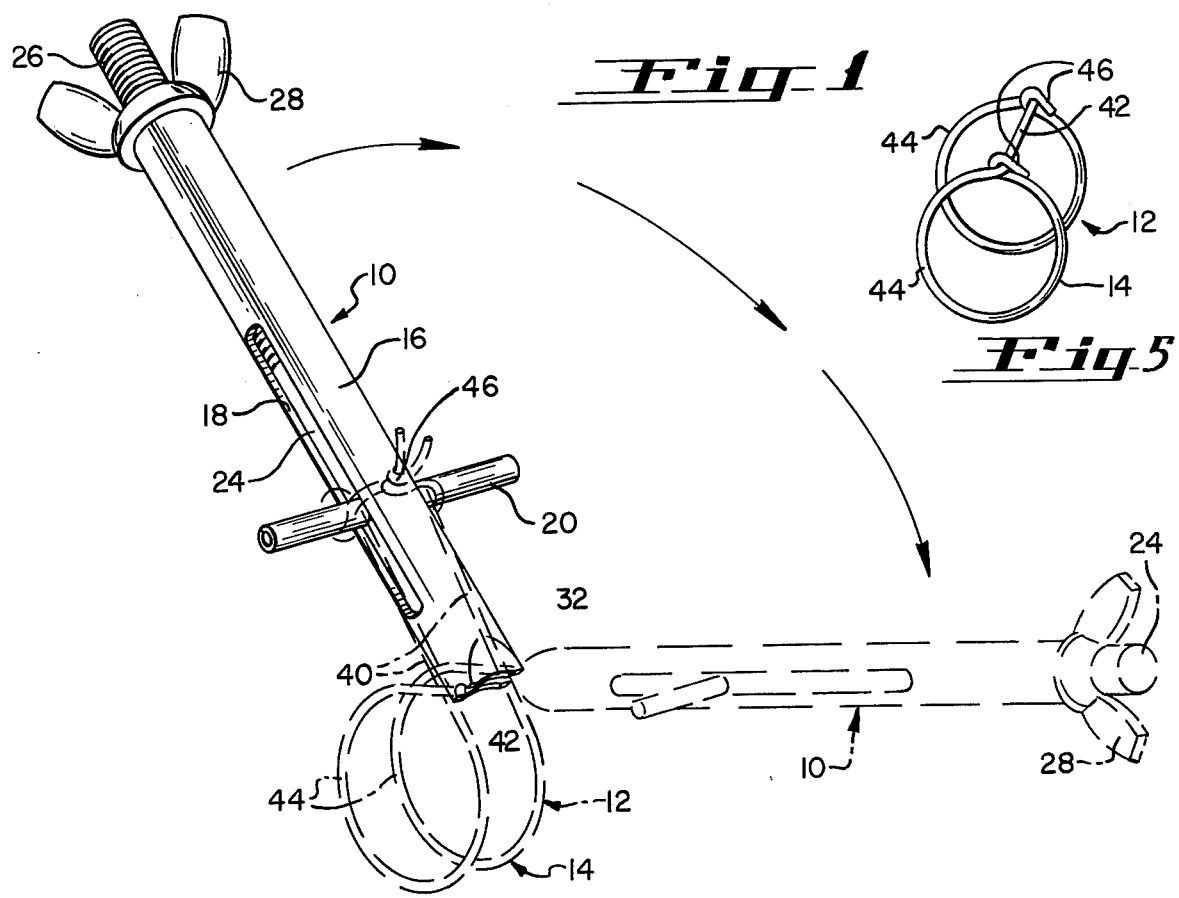
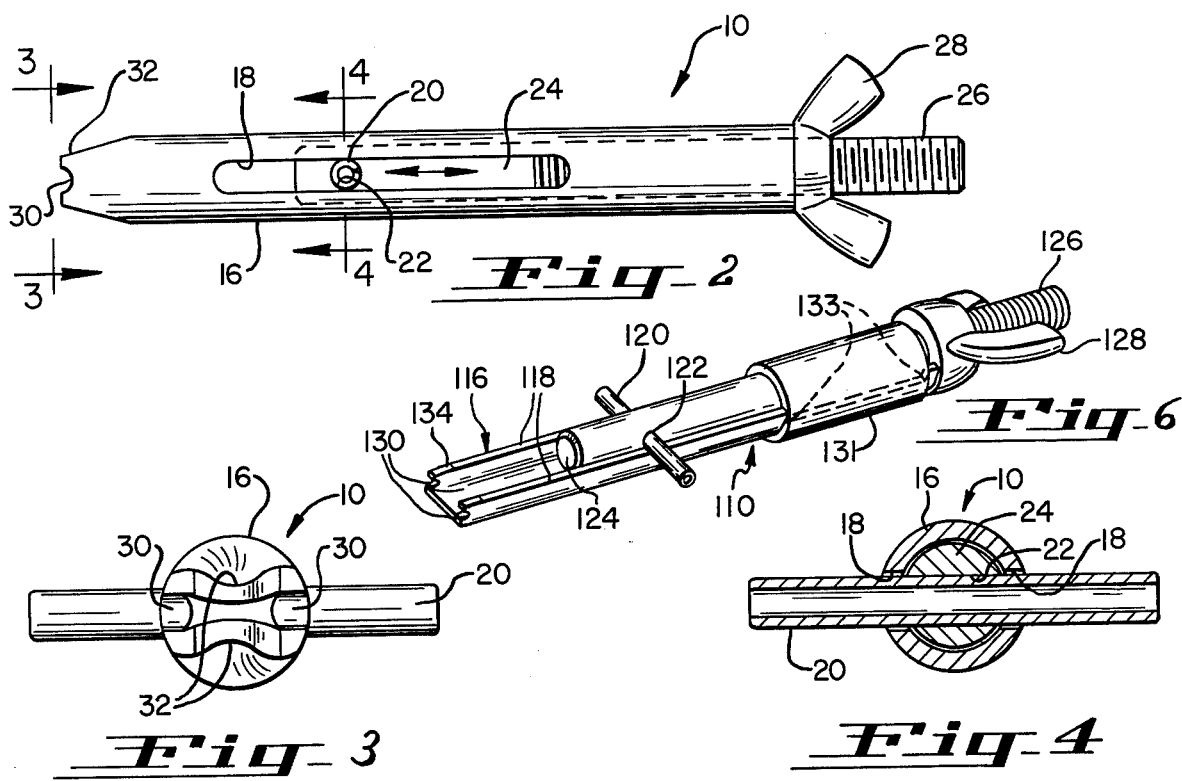

WIRE BANDING TOOL AND CABLE SPLICE

DESCRIPTION

This invention relates to an improved wire banding tool and an improved cable splice, and has for an object thereof the provision of an improved wire banding tool and an improved cable splice.

Another object of the invention is to provide a wire banding tool having a body made of commercially available tubing.

A further object of the invention is to provide a wire banding tool which is effective, durable and inexpensive.

Another object of the invention is to provide a wire banding tool having a body of a crimped and slotted tube and a puller comprising a screw carrying a roll pin projecting through the slots in the tube.

Another object of the invention is to provide a cable splice wherein hose type clamps on end portions of a plastic sleeve seal the sleeve to flanged grommets and seal the grommets to the jackets of two cable sections whose conductors are spliced electrically.

In the drawings:

FIG. 1 is a perspective view of an improved banding tool forming one embodiment of the invention;

FIG. 2 is a side elevation view of the tool of FIG. 1;

FIG. 3 is an enlarged, end view taken along line 3—3 of FIG. 2;

FIG. 4 is an enlarged, transverse, sectional view taken along line 4—4 of FIG. 2;

FIG. 5 is an enlarged perspective view of a band formed by the tool of FIG. 1;

FIG. 6 is a perspective view of an improved banding tool forming an alternative embodiment of the invention;

Figure 7:
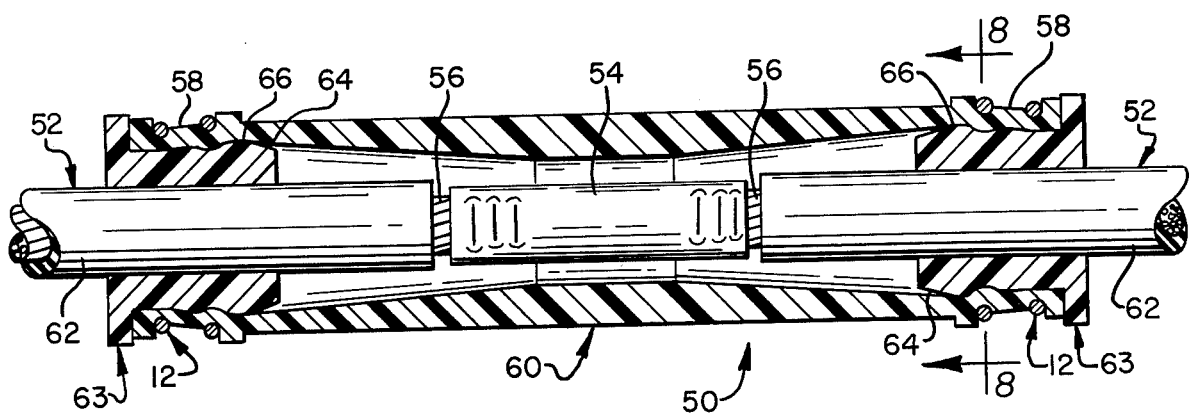
FIG. 7 is a longitudinal sectional view of a cable splice forming an alternate embodiment of the invention and formed by the tool of FIG. 1.

Referring now in detail to the drawings, there is shown in FIGS. 1-4 a band forming tool 10 forming one specific embodiment of the invention and serving to form a wire band or clamp 12 from a wire 14. The tool includes a tubular body 16 formed from a length of commercially available steel tubing. The body has a pair of slots 18 on opposite sides of the body through which extends a roll pin 20 fitting tightly in a bore 22 in a screw or rod 24 having a threaded portion 26 on which a wing nut 28 is screwed. The forward end or nose portion has aligned, wire-receiving grooves or notches 30 formed therein and has dimpled or bent in portions 32 to cause the end portion to be tapered so that the nose portion is tapered and will lie close to a hose or other article (not shown) upon which the clamp is formed and tightened.

OPERATION (FIGS. 1-5)

The wire 14 is bent into the form of an elongated "U" with end portions 40 extending under crossover or base 42, and with the hose (or other object to be clamped) inside the circular portions 44 of the wire, the nose portion of the body is placed so that the crossover portion seals in the notches 30 and the end portions of the wire are wrapped once around the roll pin 20 to snub them and are twisted together as shown at 46. Then the wing nut is turned to draw the rod to the left, as viewed in FIG. 1, to tighten the circular portions 44 on the hose. Then, while loosening the wing nut slightly, the tool is swung from its full line position of FIG. 1 to somewhat beyond its broken line position to bend the lead portions over the crossover portion to form bent retaining portions 46. Then the excess lengths of wire are cut off and the ends of the wire are bent further down to the finished positions thereof as shown in FIG. 5.

An improved band forming tool 110 forming an alternate embodiment of the invention includes a body 116 of sheet steel formed into a channel having side edges 118 guiding a roll pin 120 fitting tightly in bore 122 in a screw or rod 124 having a threaded portion 126 on which a wing nut 128 is screwed. The wing nut abuts the end of the body and the rod 124 is held in the channel by a guide sleeve 131 fitting in notches 133 in the body. At the forward or nose portions, the sides of the body are tapered at 134 and have notches 130 for fitting over a U-shaped wire in forming a hose clamp.

EMBODIMENT OF FIGS. 7-9

Figure 9:
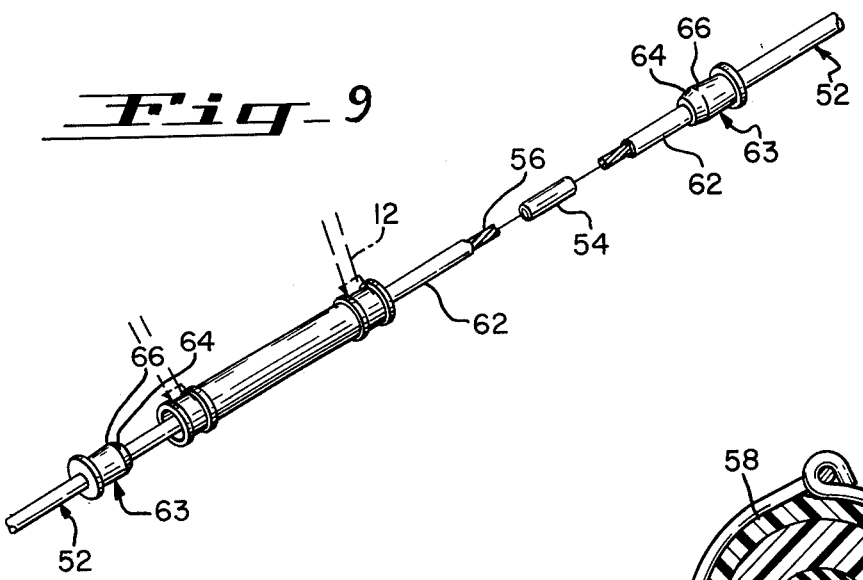
FIG. 9 is an exploded, perspective view of the cable splice of FIG. 7.
Figure 8:
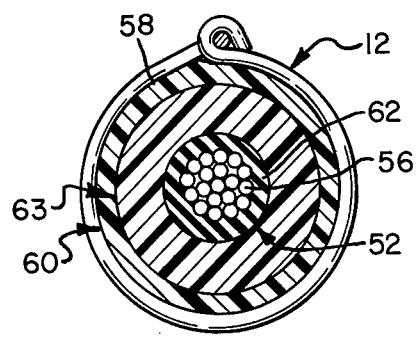
FIG. 8 is a transverse sectional view taken along line 8—8 of FIG. 7.

A cable splice 50 utilizing the clamps 12 connects two cable sections 52 together electrically and in a waterproofed manner. A crimped metallic sleeve 54 connects conductors 56 together, and with the clamps 12 placed over externally grooved end portions 58 of a waterproofing sleeve 60 of a semi-rigid plastic material, such as, for example, polyvinyl chloride, the sleeve 60 is slid from its position of FIG. 8 to that of FIG. 9 where it overlaps end portions of jackets 62 of the cable sections. The jackets are of a waterproofing resilient material such as the conventional rubber compound used for such purposes. Then relatively elastic grommets or plugs 63 of an elastomer material, such as, for example, a rubber compound, are pressed into end portions of the sleeve 60. The grommets have tapered forward end portions 64 to facilitate entry into the sleeve and enlarged central portions 66, larger than the cylindrical end portions of the sleeve into which they are pressed. The grommets have slight rearward tapers. The bands or clamps 12 are then tightened to press the sleeve into sealed engagement with the grommets and the grommets into sealed engagement with the jackets. Then the clamps 12 are completed with the ends bent down.

I claim:

1. In a hose clamp forming tool,
    elongated body means entirely of sheet metal of substantially uniform thickness having at least a bottom and two side walls and having a tapered forward end portion with end notches in the two side walls,
    a threaded puller lying in and slidable along the body means,
    the body means including a tubular portion holding the puller in the body means,
    a nut screwed onto the puller and engaging the body means,
    and wire attaching means carried by the puller.

2. The tool of claim 1 wherein the body means is tubular along the entire length thereof and has a pair of guide slots in the side walls,
    the wire attaching means comprising a pin extending through and beyond the slots.

3. The tool of claim 2 wherein the pin is a roll pin.

4. The tool of claim 3 wherein the forward end portion of the tool is bent in to form a tapered nose portion.

5. The tool of claim 2 wherein the forward end portion of the tool is bent in to form a tapered nose portion.

6. The tool of claim 1 wherein the body means comprises a channel and includes guide means overhanging a portion of the channel to hold the puller in the channel.

7. The tool of claim 6 wherein the guide means comprises a sleeve.

* * * * *